United States Patent [19]

Kelpin, Sr.

[11] Patent Number: 4,507,909
[45] Date of Patent: Apr. 2, 1985

[54] COMPACTOR AND PADDLE WHEEL FOR AQUATIC HARVESTER

[75] Inventor: Thomas G. Kelpin, Sr., Shreveport, La.

[73] Assignee: Abraham C. Kottothara, Loudonville, Ohio

[21] Appl. No.: 560,380

[22] Filed: Dec. 12, 1983

[51] Int. Cl.³ ............................................. A01D 44/00
[52] U.S. Cl. ............................................................. 56/9
[58] Field of Search ........................... 56/8, 9, 344, 345

[56] References Cited

U.S. PATENT DOCUMENTS

| | | | |
|---|---|---|---|
| 981,183 | 1/1911 | Ferriss | 56/9 |
| 2,699,135 | 1/1955 | Steiner | 56/9 |
| 3,238,708 | 3/1966 | Zickefoose | 56/9 |
| 3,449,892 | 6/1969 | Huff | 56/9 |

FOREIGN PATENT DOCUMENTS 1132804 10/1982 Canada ..................................... 56/8

Primary Examiner—Jay N. Eskovitz
Attorney, Agent, or Firm—John M. Harrison

[57] ABSTRACT

A compactor and dual paddle wheel mechanism for an aquatic harvester which includes a carriage movably mounted by means of rollers on the deck of the aquatic harvester and characterized by a serpentine chain drive system for selectively moving the carriage forwardly and rearwardly on the deck, and a rake pivoted to the carriage for engaging, relocating, compacting and unloading aquatic growth harvested by the aquatic harvester and deposited on the harvester deck. Dual, independently driven paddle wheels, which include rotating drums shaped by multiple drum panels and spaced drum closure panels, with paddles extending radially from the drums and securely anchored by braces located inside the drums serve to drive and maneuver the aquatic harvester.

20 Claims, 6 Drawing Figures

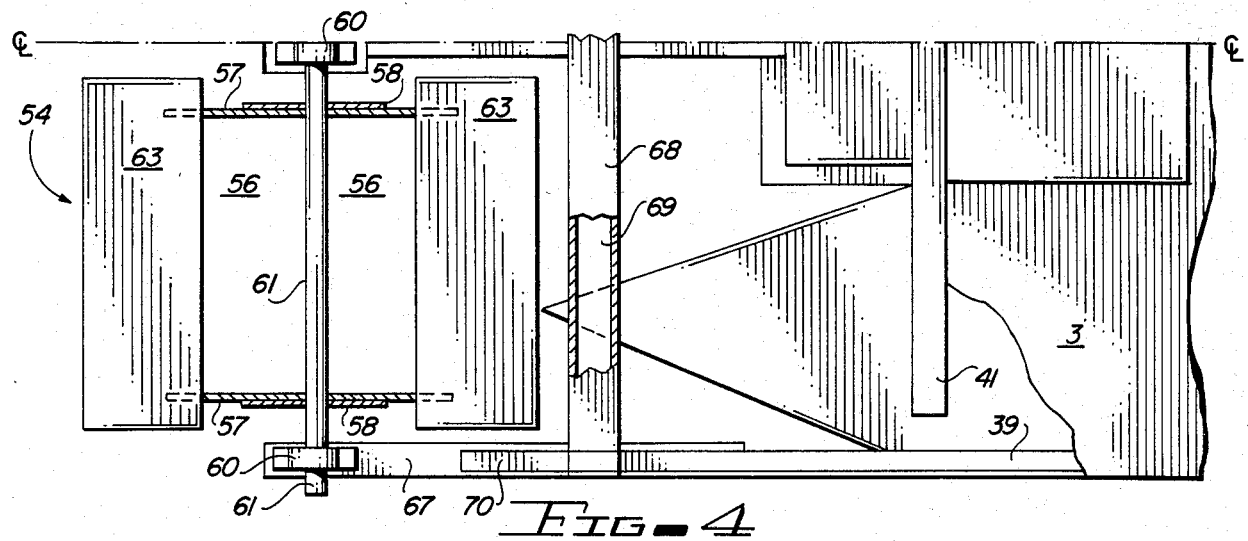
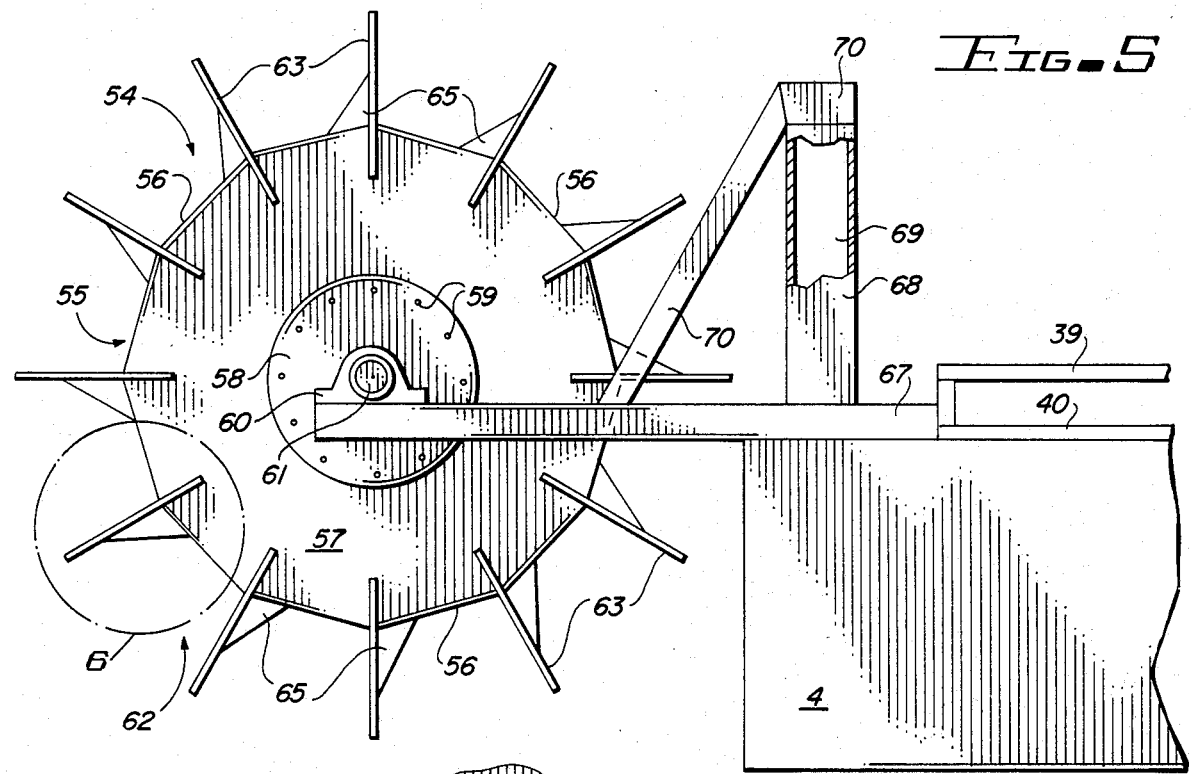
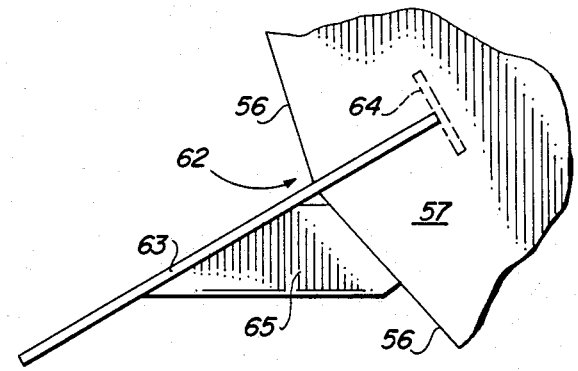

COMPACTOR AND PADDLE WHEEL FOR AQUATIC HARVESTER

BACKGROUND OF THE INVENTION

1. Field of the Invention

This invention relates to aquatic harvesters, or machines for harvesting aquatic growth from rivers and lakes and more particularly, to a new and improved rake apparatus or compactor and dual paddle wheel mechanism for redistributing, compacting and unloading aquatic growth which has been harvested and deposited on the deck of the harvester and maneuvering and driving the aquatic harvester, respectively, The compactor includes a carriage fitted with rollers designed to traverse rails on the deck of the harvester by means of a serpentine chain drive system, in order to relocate and compact aquatic growth deposited on the deck by a cutter blade and endless belt harvesting system. The rake further includes multiple, downwardly extending teeth attached to pivot arms in the carriage and raised and lowered by means of hydraulic cylinders to selectively engage and disengage the harvested aquatic plants.

In a preferred embodiment, the dual paddle wheels each include a drum which is shaped by multiple drum panels closed at both ends and fitted with multiple paddles which extend into the drum, where they are secured by multiple braces. The paddle wheels are rotatably secured to the aquatic harvester and are independently driven.

A growing problem which has become more and more acute around the world is that of the proliferation of aquatic growth and vegetation in inland streams, lakes, rivers and other waterways. This problem is intensified because of the increased use of commercial fertilizers which enter the rivers, lakes and streams as runoff from rainfall or irrigation. This factor, coupled with the depositing of human waste into such waterways, provides a fertile environment for the prolific growth of both floating and bottom-rooted vegetation which chokes the waterways. A controlled quantity of such vegetation is ecologically essential to a balanced, healthy water system, since it acts as a natural cleansing agent by absorbing pollutants in the water and serves as a habitat for a variety of aquatic life. However, when the vegetation reaches a level of overgrowth it can literally destroy the waterway environment and reduce the efficiency of the waterway for commerce or recreation.

There are very few areas in the world which are not faced with excessive aquatic vegetation growth which causes loss of water efficiency through evaporation, loss of storage capacity in reservoirs, reduction of flow rates [from clogging], damage and fouling of pumping systems and loss of recreation and navigation area. Although various chemicals such as herbicides can bring about complete elimination of the many species of weed found in water, they also pollute the water, thereby frequently adding an additional problem. Controlled vegetation harvesting is necessary to facilitate healthy water, in order to leave a selected quantity of plants to provide a filter which absorbs toxic elements and food and shelter for marine life.

There are two primary methods of controlling the over proliferation of aquatic vegetation. The first and most often currently used technique is chemical control by application of herbicides. Herbicides are quick, effective and easily obtainable and at the outset, seem to be currently cost effective. The second most common technique for controlling the growth of aquatic plants and vegetation is by mechanically harvesting the vegetation. Techniques for achieving mechanical harvesting vary from the use of small, open bow boats for manually removing the plants, to larger machines which are designed to cut the plants and load them on the harvesting machine for for future disposal. Mechanical harvesting is a safe method of plant control which results in less impact on the environment than use of herbicides. It is also non-polluting, selective in the amount and type of plant life removed and in the long run, is less costly than the repeated use of herbicides. More importantly, it provides a means for reclaiming the harvested vegetation which can be used for a variety of purposes. The water hycinth is one of the aquatic growth varieties currently clogging many waterways and is being cultivated in some environments as a natural biological filtration system for industrial and sewage waste treatment. Accordingly, it is preferred in most waterway environments not to kill all of the aquatic growth, but instead, to achieve only a selective kill or removal. It has been found that the hycinth plant absorbs both organic and inorganic pollutants, as well as undesirable metals, such as silver, lead, mercury and cadmium. In some applications, this prolific plant is periodically thinned by mechanical harvesting techniques and the vegetation is subsequently recycled and used as a source of methane gas, which is obtained through anaerobic fermentation. Such vegetation can also be converted into organic fertilizers, animal feed and even into food for human consumption.

2. Description Of The Prior Art

As described above, prior art techniques for removing aquatic growth and vegetation from lakes, streams, rivers, reservoirs and other waterways include the use of chemicals and mechanical harvesting. Of the two techniques, mechanical harvesting is more ecologically attractive, since it is non-polluting and can used to selectively remove those varieties and quantities of vegetation desired, in order to leave a selected quantity of vegetation to act as natural filters and shelter for marine life. Typical of the prior art aquatic harvesters in the "Aquatic Harvester" detailed in U.S. Pat. No. 3,698,163 dated Oct. 17, 1972, to Thomas G. Kelpin. This harvester is characterized by multiple pontoons secured to a flat deck member and propelled and steered by an above-the-water air propulsion system. The harvester includes a self-unloading conveyor system, a cutter bar assembly designed for cutting underwater weed growth and a three-phase electrical power system to operate all sub-assemblies. The machine is capable of carrying aquatic vegetation loads in excess of ten tons with a draft of approximately fifteen inches of water. U.S. Pat. No. 3,890,771 dated June 24, 1973, also to Thomas G. Kelpin, discloses an improved aquatic harvester having multiple pontoons secured below the flat deck member, a pickup assembly mounted on the forward end of the craft to collect aquatic material and an above-the-water propulsion and steering system, including an air propulsion unit. The improvement includes pontoon members characterized by at least one closed, integrally formed, buoyant capsule constructed of a plastic material. U.S. Pat. No. 3,847,105 entitled "Aquatic Harvester" and dated Nov. 12, 1974, to Thomas G. Kelpin discloses a similar aquatic harvester, detailing the above-the-water air propulsion system. An "Aquatic Plant Sampler" is described in U.S. Pat. No. 4,177,624 to Thomas G. Kelpin, which device includes an aquatic craft having a plurality of pontoons secured to a flat deck member and propelled and steered by a dual power system, which includes an above-the-water air propulsion mechanism and an underwater drive system. The aquatic plant sampler is further characterized by a sampling bucket fitted with a chain drive cutter system, which bucket is capable of being lowered through a hole provided in the center of the deck to collect aquatic plants, specimens and water bottom samples for analysis, with a view towards controlling such vegetation.

It is an object of this invention to provide a new and improved rake assembly or compactor for organizing, compacting and unloading aquatic growth deposited on the deck of an aquatic harvester and maintaining the aquatic harvester or an even keel during both the loading and the unloading operations.

Another object of the invention is to provide a new and improved paddle wheel system consisting of two paddle wheels mounted at the stern of an aquatic harvester, each of which paddle wheels is independently driven and is characterized by a shaped drum having multiple paddles extending radially through the drum from points of anchor inside the drum and rotatably mounted on the stern of the harvester.

Yet another object of this invention is to provide a new and improved rake assembly or compactor for moving and compacting aquatic vegetation deposited on the deck of an aquatic harvester by a harvesting mechanism, which compactor is characterized by easy maintenance and eliminates the need for a long conveyor bed or large loading apron and is further characterized by a movable carriage driven by a serpentine chain drive system and provided with a pivoted, cylinder-operated rake containing teeth for engaging, compacting and disengaging the harvested aquatic growth.

A still further object of the invention is to provide a new and improved paddle wheel system for an aquatic harvester, which system is characterized by a pair of paddle wheels mounted in side-by-side relationship on the stern of the harvester and individually powered in order to facilitate high maneuverability and efficient operation of the harvester.

A still further object of this invention is to provide a new and improved compactor and paddle wheel system for an aquatic harvester, which compactor includes a carriage mounted on rails on the deck of the aquatic harvester and driven in either of two directions by a serpentine chain drive system, with a rake having multiple teeth fitted therein and pivotally mounted on the carriage for selective engagement, movement and compacting of aquatic growth loaded on the deck by operation of hydraulic cylinders, the paddle wheel system further including a pair of rotating drums, each drum characterized by multiple drum panels closed at both ends and having multiple paddles extending radially and outwardly from a mounting point within the drum, the paddle wheels independently driven, in order to facilitate maximum maneuverability and efficiency in operation of the harvester.

SUMMARY OF THE INVENTION

These and other objects of the invention are realized in an improved rake assembly or compactor and paddle wheel system for an aquatic harvester, which compactor is further characterized by a rail-mounted carriage which is movable from front to rear on the deck of an aquatic harvester by means of a serpentine drive system and a rake pivoted to the carriage and designed by operation of hydraulic cylinders to selectively engage, relocate and compact vegetation harvested and stacked on the deck of the harvester, the paddle wheel system further including a pair of paddle wheels mounted in side-by-side relationship, each of the paddle wheels further including a shaped drum closed at both ends and rotatably secured to the rear of the harvester with multiple paddles extending radially from mounting points within the drum, the paddle wheels independently driven to facilitate maximum maneuverability and efficiency in operating the aquatic harvester.

BRIEF DESCRIPTION OF THE DRAWINGS

The invention will be better understood by reference to the accompanying drawings, wherein:

FIG. 4 is a plan view of one side of the aquatic harvester and one of the dual paddle wheels in functional orientation;

FIG. 5 is a side view of the rear portion of the aquatic harvester and one of the paddle wheels, more particularly illustrating a preferred paddle wheel design; and FIG. 6 is a paddle detail of the paddle wheel illustrated in FIGS. 4 and 5.

DESCRIPTION OF THE PREFERRED EMBODIMENTS

Figure 1:
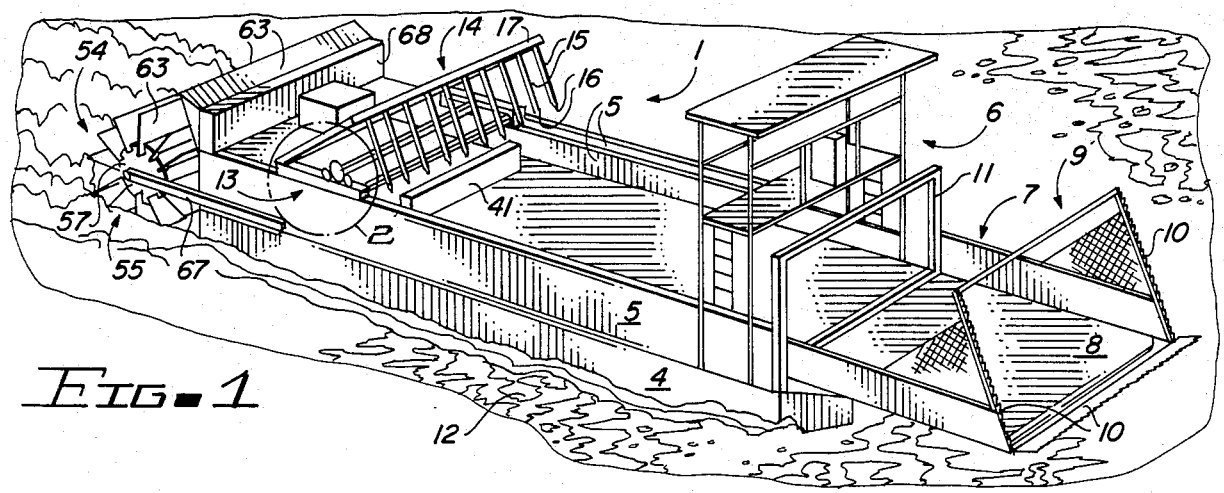
FIG. 1 is a perspective view of an aquatic harvester with the compactor and dual paddle wheels of this invention mounted thereon.

Referring now to FIG. 1 of the drawings an aquatic harvester is generally illustrated by reference numeral 1 floating on a body of water 12 and the compactor of this invention is mounted on the aquatic harvester 1 and is generally illustrated by reference numeral 13. The compactor 13 is further characterized in a preferred embodiment by a rake 14, which includes a tooth bar 17, spanning the width of the deck 3 of the aquatic harvester 1, and disposed between the sides 5 of the deck 3 when the teeth 15 are deployed downwardly to engage aquatic vegetation, [not illustrated], accumulated on the deck 3, as hereinafter described. The aquatic harvester 1 is further provided with pontoons 4, a wheel house 6, from which the aquatic harvester 1 is operated, and a loading apron 7, which is pivotally secured to an apron support 11. The loading apron 7 is raised and lowered by the operator to facilitate operation of cutter blades 10, located on a cutter bar 9, to loosen aquatic vegetation in the water 12, which vegetation is in turn loaded onto the deck 3 by means of a conveyor belt 8. It will be appreciated that the aquatic harvester 1 is driven by a pair of paddle wheels 54, mounted in side-by-side relationship and operated by separate diesel engines. Paddle wheels 54 include multiple paddles 63, which extend radially from a drum 55, which is rotatably secured to a paddle wheel support 67, mounted on the deck 3 and sides 5 of the aquatic harvester 1. Accordingly, it will be appreciated that when the paddle wheels 54 drive the aquatic harvester 1 forward through a body of aquatic growth, the cutter blades 10 operate to cut the aquatic vegetation and as it is deposited on the conveyor belt 8, it is moved rearwardly and is then deposited on the deck 3 for compacting by the compactor 13, as hereinafter more particularly detailed.

Figure 2:
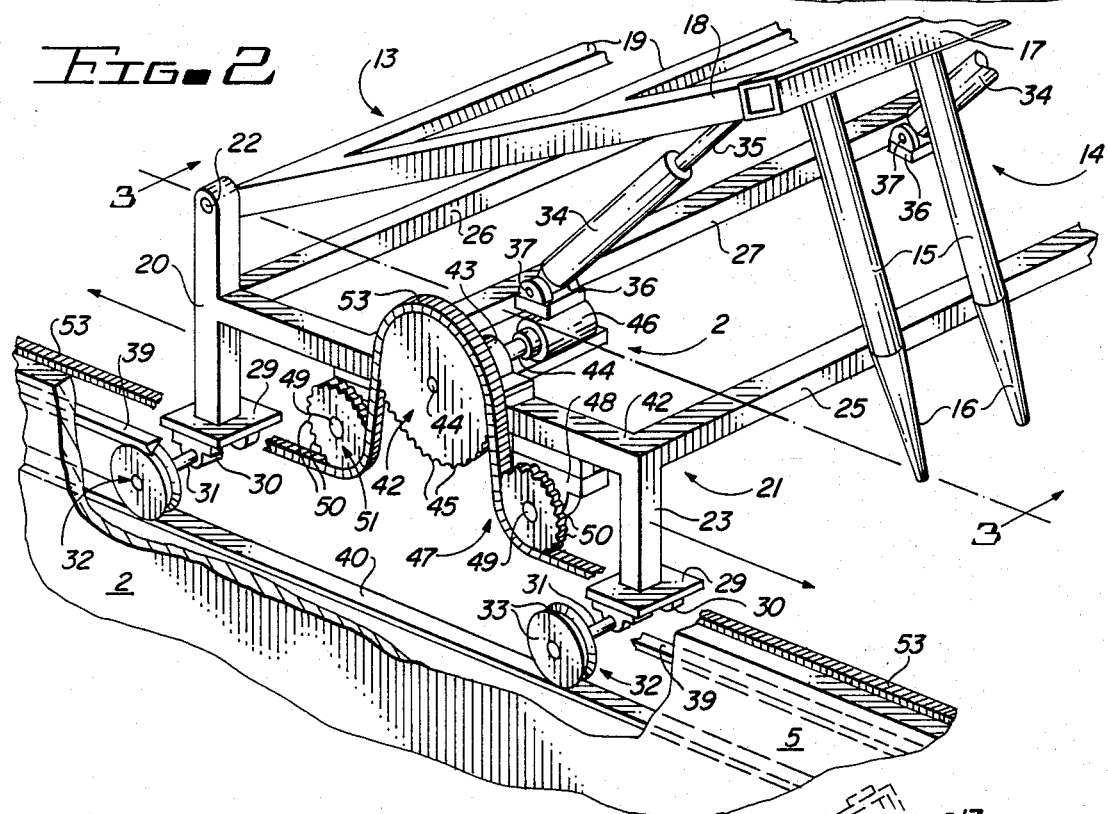
FIG. 2 is a perspective view, partially in section, of a preferred embodiment of the compactor.
Figure 3:
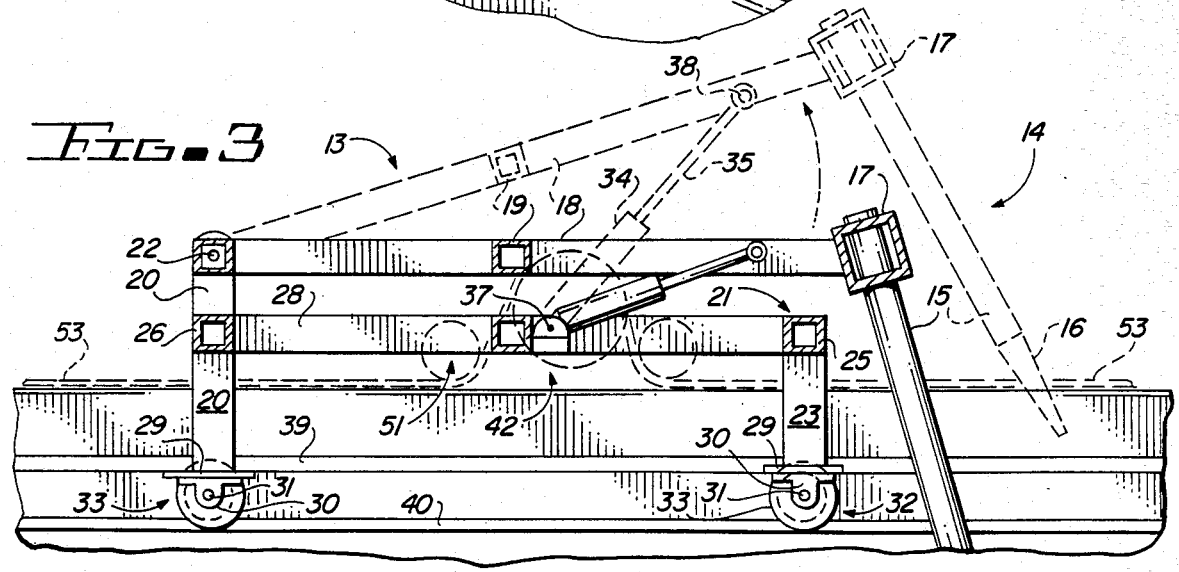
FIG. 3 is a side sectional view, taken along lines 3—3 in FIG. 2, more particularly illustrating the compactor.

Referring now to FIGS. 2 and 3 of the drawings, the rake drive 2 is more particularly illustrated in cooperation with a carriage 21. The carriage 21 consists of a structure shaped by a front support 25, a rear support 26, which is disposed in essentially horizontal relationship with respect to the front support 25, and a drive support 24, positioned parallel to and spaced from a side support 28, both of the latter of which attach to the front support 25 and the rear support 26 in perpendicular relationship, respectively, as illustrated. Downwardly extending arm supports 20 are provided at the rear of the carriage 21 and are attached to the drive support 24 and the rear support 26 at one corner, and to the side support 28 and the rear support 26, at an opposite corner. A wheel plate 29 is secured to the bottom of each of the arm supports 20 and each wheel plate 29 in turn carries a bearing 30, which rotatably receives one end of an axle 31, supporting a wheel 32. Each wheel 32 is further provided with spaced wheel flanges 33, which engage a top rail 39 and a bottom rail 40, provided in the sides 5 of the aquatic harvester 1. Front legs 23 extend downwardly from the intersection between the drive support 24 and front support 25 and between the side support 28 and the front support 25, respectively, and a wheel plate 29 is also provided at the bottom end of each of the front legs 23. A bearing 30 is suspended from each of the wheel plates 29 and an axle 31 extends from the bearing 30 to receive a third and fourth wheel 32, each equipped with wheel flanges 33. As illustrated, the front and rear wheels 32 are in alignment, respectively, on both sides of the carriage 21 and are constrained to remain in position on the top rail 39 and the bottom rail 40 by the wheel flanges 33. A pivot arm 18 is secured to each of the extending ends of the arm supports 20 by means of a hinge pin 22 and is supported in pivotal relationship on each hinge pin 22 by a pair of cylinders 34 and cooperating cylinder pistons 35. Each of the cylinders 34 is secured to a common cylinder support 27, which is attached at one end to the drive support 24 and at the other end to the side support 28, by means of a cylinder bracket 36 and a cooperating bracket pin 37. Each cylinder piston 35 is in turn secured to a separate pivot arm 18 by means of a piston mount pin 38, which extends from each pivot arm 18. The tooth bar 17 extends between the projecting ends of the pivot arms 18 and is connected to the extending teeth 15, projecting in spaced relationship from the tooth bar 17, and is further provided with tapered tips 16, for engaging aquatic growth. A first arm brace 19 is deployed between the arm supports 20 and a second arm brace 19 spaces the pivot arms 18 and is parallel to the tooth bar 17, to brace the tooth bar 17 and teeth 15.

As is more particularly illustrated in FIG. 2 of the drawings, in a most preferred embodiment of the invention the compactor 13 incorporates a rake drive 2, which includes a drive sprocket 42, provided with drive sprocket teeth 45, secured to a drive sprocket shaft 44, which is rotatably mounted in a drive sprocket bearing 43, secured to the drive support 24 of the carriage 21. A front idler sprocket 47 is also rotatably attached to the drive support 24 at a point beneath the drive sprocket 42 by means of an idler sprocket bearing 48 and a cooperating idler sprocket shaft 49. The front idler sprocket 47 is fitted with idler sprocket teeth 50, which are in alignment with the drive sprocket teeth 45 of the drive sprocket 42. Similarly, a rear idler sprocket 51 is situated on the opposite side of the drive sprocket 42 and is oriented in alignment with both the drive sprocket 42 and the front idler sprocket 47. The rear idler sprocket 51 is likewise secured to an idler sprocket shaft 49, rotatably carried by an idler sprocket bearing 48. Both ends of a chain 53 are secured to the deck 3 of aquatic harvester 1 and the chain 53 is threaded from bottom to top around the rear idler sprocket 51, around the drive sprocket 42 and subsequently from top to bottom around the front idler sprocket 47, as illustrated. A hydraulic sprocket drive motor 46, is positioned in engagement with the drive sprocket shaft 44, in order to rotate the drive sprocket 42 in either direction to facilitate operation of the carriage 21 in a selected direction on the top rail 39 and the bottom rail 40, as indicated by the arrows. Accordingly, referring again to FIG. 1 of the drawings, it will be appreciated that the sprocket drive motor 46 can be operated to rotate the drive sprocket 42 in either direction, in order to cause the carriage 21 and the rake 14 to traverse the deck 3 of the aquatic harvester 1 and compact aquatic vegetation accumulating on the deck 3, as hereinafter described.

Referring now to FIGS. 1 and 4–6 of the drawings, and initially to FIGS. 4 and 5, one of the paddle wheels 54 of the aquatic harvester 1 is illustrated, mounted in rotatably relationship on the rearwardly projecting paddle wheel supports 67 which are secured to the stern of the aquatic harvester 1. While only one of the paddle wheels 54 is illustrated in FIGS. 4 and 5, it will be appreciated that another paddle wheel, which is indentical in construction and functional orientation to the illustrated paddle wheel 54, is mounted adjacent to the first paddle wheel 54. This mounting arrangement facilitates maximum efficiency in forward, reverse and turning operation of the aquatic harvester 1, as hereinafter described. Each of the paddle wheels 54 are constructed of multiple drum panels 56, which seat along longitudinal edges against the paddles 63, which paddles 63 extend radially from the paddle wheels 54 and space the respective drum panels 56. The paddles 63 extend between the drum panels 56 into the interior of the paddle wheels 54, and are each secured to a paddle brace 64, spanning the distance between a pair of drum closure panels 57, secured to each end of the drum panels 56 and closing the paddle wheels 54, respectively. A closure plate 58 is in turn mounted to each of the drum closure panels 57 by means of plate fasteners 59 and each closure plate 58 carries one end of a paddle wheel shaft 61, which extends through the paddle wheels 54, respectively, and is rotatably mounted on each paddle wheel support 67, by means of a paddle wheel bearing 60.

Referring specifically to the paddle detail 62 illustrated in FIG. 6 of the drawings, in a most preferred embodiment of the invention the paddles 63 are each fitted with a paddle gusset 65, which extends between the paddles 63 and the respective drum panels 56, in order to strengthen the paddles 63. This feature, in combination with the projection of the paddles 63 radially into the interior of the paddle wheels 54 for attachment to a paddle brace 64, serve to provide paddle wheels 54 of surprising strength and durability.

Referring again to FIGS. 4 and 5, in yet another preferred embodiment of the invention the hydraulic fluid cooler 68, which functions to cool hydraulic fluid used to operate the hydraulic motors in the aquatic harvester 1, is located immediately forward of the paddle wheels 54. Hydraulic fluid is caused to circulate through the hollow interior 69 of the hydraulic fluid cooler 68 and in a most preferred embodiment of the invention, the hydraulic fluid cooler 68 is rectangular in shape and the hollow interior 69 is of sufficient size to cool a volume of hydraulic fluid necessary to operate hydraulic motors of selected size in the aquatic harvester 1. Location of the hydraulic fluid cooler 68 at a point on the deck 3 of the aquatic harvester 1 which is immediately adjacent the paddle wheels 54 serves to facilitate splashing of water on the hydraulic fluid cooler 68 by action of the paddle wheels 54, to cool the hydraulic fluid. Cooler braces 70 serve to secure the hydraulic fluid cooler in position adjacent the paddle wheels 54. A rear container wall 41 is also secured to the deck 3 forward of the hydraulic fluid cooler 68 and serves to provide a wall against which the aquatic growth is compacted by operation of the compactor 13.

In operation, and referring initially to FIGS. 2 and 3 of the drawings, under circumstances where it is desired to compact an accumulation of aquatic weeds or growth deposited by operation of the harvesting mechanism on the deck 3 of the aquatic harvester 1, the compactor 13 is in employed for this purpose. When the accumulation of aquatic growth on the deck 3 in an area immediately behind the apron support 11 and beneath the wheel house 6 is sufficiently great to require compaction, the sprocket drive motor 46 in the compactor 13 is hydraulically activated and the drive sprocket 42 operates to cause the front idler sprocket 47 and the rear idle sprocket 51 to traverse the chain 53 and the carriage 21 to traverse the deck 3 forwardly toward the wheel house 6. As the carriage 21 moves forwardly on the top rail 39 and bottom rail 40, the cylinders 34 are activated to raise the pivot arms 18, tooth bar 17 and the teeth 15 in the rake 14 to the position illustrated in FIG. 2. When the carriage 21 is located sufficiently near the wheel house 6 to enable the teeth 15 in the rake 14 to engage the accumulated aquatic growth, the carriage 21 is stopped and the rake 14 is lowered by activation of the cylinders 34, to effect engagement between the teeth 15 and the aquatic growth. When the tapered tips 16 of the teeth 15 are lowered in close proximity to the deck 3, the sprocket drive motor 46 is reversed and the carriage 21 is caused to move rearwardly away from the wheel house 6 and toward the paddle wheel 54, pulling the accumulated stack of aquatic growth with it. The carriage 21 is then caused to move rearwardly toward the paddle wheel 54 to the maximum travel on the deck 3 where the aquatic growth is compacted against the rear container wall 41, and the rake 14 is again raised by operation of the cylinders 34 to the position illustrated in FIGS. 1 and 2. When a second accumulaton of aquatic growth is deposited on the deck 3 beneath the wheel house 6 the procedure is repeated, with successive rearward movements of the carriage 21 and rake 14 effecting a compacting of the aquatic growth removed from the loading apron area by compactor 13. When the accumulated aquatic growth has been compacted to the maximum extent against the rear container wall 41 and the carriage 21 cannot be moved rearwardly to effect additional compacting because of the volume of aquatic growth accumulated on the deck 3 of the aquatic harvester 1, the aquatic harvester 1 is maneuvered to the shore. The loading apron 7 is then positioned on the shoreline, the conveyor belt 8 reversed and the compactor 13 used to push the compacted aquatic growth onto the conveyor belt 8 for unloading on shore. It will be appreciated by those skilled in the art that the procedure for unloading the aquatic growth 1 is a reverse of the procedure heretofore described for compacting the aquatic growth, with the carriage 21 moved initially rearwardly to maximum travel, the rake 14 lowered by operation of the cylinders 34 to a point immediately forward of the rear container wall 41 and the carriage 21 moved forwardly toward the wheel house 6, to force the aquatic growth onto the conveyor belt 8 of the loading apron 7. Since the linear movement of the carriage 21 can be closely controlled by the operator, the aquatic growth can be both compacted and unloaded at a controlled rate which is commensurate with the rate of operation of the conveyor belt 8 in the loading apron 7. It will be further appreciated that the compactor 13 is used to periodically relocate and compact the vegetation and thereby maintain an essentially equal weight distribution on the deck 3 of the aquatic harvester 1. This balancing of the aquatic plant load is important, in order to prevent the aquatic harvester from settling at the bow and raising the paddle wheels 54 from the water 12.

Referring now to FIGS. 4-6 of the drawings of the maneuverability of the aquatic harvester 1 through beds of aquatic vegetation in selective paths with the cutter bar 9 positioned at various cutting depths is easily facilitated by the twin paddle wheels 54. Precise location of the aquatic harvester 1 in a desired cutting orientation can be achieved by operating one or both of the paddle wheels 54 independently of each other, since both paddle wheels 54 are separately driven, to align the aquatic harvester 1 in a desired path. Maximum speed is achieved by operating both paddle wheels 54 in the forward or reverse direction simultaneously, while directional movement is controlled by operating one of the paddle wheels 54 either at a higher speed, or independently of the other paddle wheel. Turning of the aquatic harvester on its axis is possible by operating one of the paddle wheels 54 in one direction and the second paddle wheel 54 in the opposite direction. Since the paddles 63 of the paddle wheels 54 extend only to a depth of about 6 inches to 1 foot into the water, movement of the aquatic harvester 1 through thick beds of aquatic growth is easily facilitated with maximum efficiency and maneuverability. It has been found that under circumstances where the aquatic harvester 1 must be maneuvered through such thick beds of aquatic vegetation, additional strain is placed on the paddle wheels 54 because of repetitive contact between the individual paddles 63 and the aquatic vegetation, in addition to the water which floats the aquatic harvester 1. Accordingly, the structural features of the paddle wheels 54 illustrated in FIGS. 5 and 6 of the drawings are important, particularly as to the feature wherein the paddles 63 project between adjacent surfaces of the drum panels 56 to mount on paddle braces 64 extending between and mounted to the drum closure panels 57. As further illustrated in FIG. 6 of the drawings, this structural feature, in combination with the provision of paddle gussets 65, facilitates improved paddle wheels 54 which are extremely strong and durable and are capable of traversing fields of aquatic growth of varying density at a desired speed without structural damage.

Referring again to FIG. 5 of the drawings, one of the problems realized in the operation of hydraulic motors is the cooling of the hydraulic fluid used to operate such motors. Accordingly, another important feature of this invention is the location of the hydraulic fluid cooler 68 in close proximity to the paddle wheels 54 and shaping the hydraulic fluid cooler 68 in a rectangular configuration, which is upward-standing on the deck 3 in order to provide a maximum surface area for cooling the hydraulic fluid located in the hollow interior 69. It will be appreciated that water which is retained on and splashed upwardly by the paddles 63 pursuant to operation of the paddle wheels 54, impinges on the hydraulic fluid cooler 68 and cools the hydraulic fluid located in the hollow interior 69. The location of the hydraulic fluid cooler 68 in such close proximity to the paddle wheels 54 has proved to be a very efficient means of cooling hydraulic fluid used to operate the various hydraulic fluid motors.

Referring again to the drawings, it will be appreciated by those skilled in the art that the various features of this invention, including the compactor 13, the improved, independently operated paddle wheels 54 and the location and design of the hydraulic fluid cooler 68, are important attributes to the aquatic harvester 1. These features facilitate easy maintenance and enable the efficient handling of a five to twenty ton variation in aquatic plant load, depending upon the size of the aquatic harvester 1. The particular design of the compactor 13 also eliminates the requirement of the conventional long conveyor bed and apron to handle the harvested vegetation and is designed to facilitate rapid and easy maintenance.

As illustrated in FIGS. 1, 4 and 5 of the drawings the compactor 13 is able to traverse the deck 3 of the aquatic harvester 1 almost to the hydraulic fluid cooler 68, since the top rail 39 and bottom rail 40 extend past the rear container wall 41. This position of the compactor 13 facilitates lowering of the teeth 15 in the rake 14 to a point immediately forward of the rear container wall 41, as illustrated in FIG. 1, in order to facilitate unloading of the entire accumulation of aquatic vegetation from the deck 3.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. In an aquatic harvester having a deck, pontoons disposed beneath the deck, a loading apron provided on one end of the deck and an aquatic vegetation cutter in cooperation with the loading apron, wherein the improvement comprises a carriage characterized by a frame; wheels carried by said frame; rail means extending longitudinally along the deck in spaced relationship and receiving said wheels; and drive means carried by said frame, whereby said wheels are selectively caused to traverse said rail means in a forward and reverse direction along the deck; and rake means pivotally carried by said frame and adapted for sequential engagment of aquatic vegetation deposited on the deck by the loading apron and selectively redistributing and compacting the aquatic vegetation on the deck responsive to controlled traversal of the deck by said carriage.

2. The aquatic harvester of claim 1 wherein said rake means further comprises a pair of pivot arms pivotally attached to said frame in spaced relationship; a tooth bar joining the free ends of said pivot arms; a plurality of teeth extending downwardly in spaced relationship from said tooth bar; and rake lift means secured to said frame and cooperating with at least one of said pivot arms, whereby said pivot arms are caused to pivot with respect to said frame to selectively raise and lower said teeth.

3. The aquatic harvester of claim 1 wherein said drive means further comprises a drive sprocket rotatably carried by said frame; a drive motor in cooperation with said drive sprocket; a pair of idler sprockets rotatably carried by said frame and located on each side of said drive sprocket; a chain having both ends secured to opposite, spaced points on the deck, said chain engaging said drive sprocket and said idler sprockets in serpentine configuration intermediate said spaced points, whereby rotation of said drive sprocket causes said carriage to move with respect to said chain.

4. The aquatic harvester of claim 1 wherein said wheels are further characterized by a first pair of wheels having first wheel flanges, said first pair of wheels located on one side of said frame and said first wheel flanges engaging one of said rail means and a second pair of wheels having second wheel flanges, said second pair of wheels located on the opposite side of said frame from said first pair of wheels, said second wheel flanges engaging another of said rail means.

5. The aquatic harvester of claim 1 wherein:
(a) said drive means further comprises a drive sprocket rotatably carried by said frame; a drive motor in cooperation with said drive sprocket; a pair of idler sprockets rotatably carried by said frame and located on each side of said drive sprocket; a chain having both ends secured to opposite, spaced points on said deck, said chain engaging said drive sprocket and said idler sprockets in serpentine configuration intermediate said spaced points, whereby rotation of said drive sprocket causes said carriage to move with respect to said chain; and
(b) said wheels are further characterized by a first pair of wheels having first wheel flanges, said first pair of wheels located on one side of said frame and said first wheel flanges engaging one of said rail means and a second pair of wheels having second wheel flanges, said second pair of wheels located on the opposite end of said frame from said first pair of wheels, said second wheel flanges engaging another of said rail means.

6. The aquatic harvester of claim 2 wherein said rake lift means is at least one fluid cylinder.

7. The aquatic harvester of claim 1 wherein:
(a) said carriage means further comprises a frame; wheels carried by said frame; rail means extending longitudinally along the deck in spaced relatinship and receiving said wheels; a drive sprocket rotatably carried by said frame; a drive motor in cooperation with said drive sprocket; a pair of idler sprockets rotatably carried by said frame and located on each side of said drive sprocket; a chain having both ends secured to opposite, spaced points on the deck, said chain engaging said drive sprocket and said idler sprockets in serpentine configuration intermediate said spaced points, whereby rotation of said drive sprocket causes said carriage to move with respect to said chains; and
(b) said rake means further comprises a pair of pivot arms having one end pivotally attached to said frame in spaced relationship; a tooth bar joining the opposite ends of said pivot arms; a plurality of teeth extending downwardly in spaced relationship from said tooth bar; and at least one hydraulic cylinder secured to said frame and cooperating with at least one of said pivot arms, whereby said pivot arms are caused to selectively pivot with respect to said frame to raise and lower said teeth.

8. The aquatic harvester of claim 7 wherein said wheels are further characterized by a first pair of wheels having first wheel flanges, said first pair of wheels located on one side of said frame and said first wheel flanges engaging one of said rail means and a second pair of wheels having second wheel flanges, said second pair of wheels located on the opposite side of said frame from said first pair of wheels, said second wheel flanges engaging another of said rail means.

9. The aquatic harvester of claim 1 further comprising a pair of paddle wheels rotatably extending from the opposite end of the deck from the loading apron and positioned in side-by-side relationship, each of said paddle wheels characterized by drum shaped in the configuration of a regular polygon; closure panels closing both ends of said drum; a shaft extending longitudinally and fixedly through said drum and projecting through said closure panels; a plurality of paddles extending radially into said drum in spaced relationship; and a plurality of braces mounted inside said drum and receiving one end of each of said paddles, respectively.

10. The aquatic harvester of claim 1 further comprising a pair of paddle wheels rotatably extending from the opposite end of the deck from the loading apron and positioned in side-by-side relationship, each of said paddle wheels characterized by a drum shaped in the configuration of a regular polygon; closure panels closing both ends of said drum; a shaft extending longitudinally and fixedly through said drum and projecting through said closure panels; a plurality of paddles extending radially into said drum in spaced relationship; and a plurality of braces mounted inside said drum and receiving one each of said paddles, respectively, and wherein:
(a) said carriage means further comprises a frame; wheels carried by said frame; rail means extending longitudinally along the deck in spaced relationship and receiving said wheels; and drive means carried by said frame, whereby said wheels are selectively caused to traverse said rail means in a forward and reverse direction along the deck; and
(b) said rake means further comprises a pair of pivot arms pivotally attached to said frame in spaced relationship; a tooth bar joining the free ends of said pivot arms; a plurality of teeth extending downwardly in spaced relationship from said tooth bar; and rake lift means secured to said frame and cooperating with at least one of said pivot arms, whereby said pivot arms are caused to pivot with respect to said frame to raise and lower said teeth.

11. The aquatic harvester of claim 10 wherein:
(a) said drive means further comprises a drive sprocket rotatably carried by said frame; a drive motor in cooperation with said drive sprocket; a pair of idler sprockets rotatably carried by said frame and located on each side of said drive sprocket; a chain having both ends secured to opposite, spaced points on said deck, said chain engaging said drive sprocket and said idler sprockets in serpentine configuration intermediate said spaced points, whereby rotation of said drive sprocket causes said carriage to move with respect to said chain; and
(b) said wheels are further characterized by a first pair of wheels having first wheel flanges, said first pair of wheels located on one side of said frame and said first wheel flanges engaging one of said rail means and a second pair of wheels having second wheel flanges, said second pair of wheels located on the opposite end of said frame from said first pair of wheels, said second wheel flanges engaging another of said rail means.

12. The aquatic harvester of claim 10 wherein said rake lift means is at least one fluid cylinder.

13. The aquatic harvester of claim 9 wherein said wheels are further characterized by a first pair of wheels having first wheel flanges, said first pair of wheels located on one side of said frame and said first wheel flanges engaging one of said rail means and a second pair of wheels having second wheel flanges, said second pair of wheels located on the opposite side of said frame from said first pair of wheels, said second wheel flanges engaging another of said rail means.

14. In an aquatic harvester having a generally rectangular shaped deck; pontoons disposed beneath the deck; a loading apron pivotally secured to one end of the deck and a cutter assembly carried by the loading apron, wherein the improvement comprises a frame; wheels carried by said frame; rails means extending longitudinally along the deck in spaced relationship and receiving said wheels; and drive means carried by said frame, whereby said wheels are selectively caused to traverse said rail means in a forward and reverse direction along the deck; a pair of pivot arms pivotally attached to said frame in spaced relationship; a tooth bar joining the free ends of said pivot arm; a plurality of teeth extending downwardly in spaced relationship from said tooth bar; and rake lift means secured to said frame and cooperating with at least one of said pivot arms, whereby said pivot arms are caused to pivot with respect to said frame to raise and lower said teeth; and a pair of paddle wheels rotatably extending from the opposite end of the deck from the loading apron and positioned in side-by-side relationship, each of said paddle wheels characterized by multiple faces defining a drum shaped in the configuration of a regular polygon; closure panels closing opposite ends of said drum; a shaft extending longitudinally and fixedly through said drum and projecting through said closure panels; a plurality of paddles extending into said drum at the junctures of said faces, respectively, in spaced relationship; and a plurality of braces extending between said closure panels inside said drum, each of said braces receiving one end of said paddles to secure said paddles in said drum.

15. The harvester of claim 14 wherein:
(a) said drive means further comprises a drive sprocket rotatably carried by said frame; a drive motor in cooperation with said drive sprocket; a pair of idler sprockets rotatably carried by said frame and located on each side of said drive sprocket; a chain having both ends secured to opposite, spaced points on said deck, said chain engaging said drive sprocket and said idler sprockets in serpentine configuration intermediate said spaced points, whereby rotation of said drive sprocket causes said carriage to move with respect to said chain; and
(b) said wheels are further characterized by a first pair of wheels having first wheel flanges, said first pair of wheels located on one side of said frame and said first wheel flanges engaging one of said rail means and a second pair of wheels having second wheel flanges, said second pair of wheels located on the opposite end of said frame from said first pair of wheels, said second wheel flanges engaging another of said rail means.

16. The harvester of claim 15 wherein said rake lift means is at least one hydraulic cylinder.

17. The aquatic harvester of claim 9 further comprising a hydraulic fluid cooler positioned on the deck adjacent said paddle wheels and situated to receive water from said paddle wheels to cool hydraulic fluid in said hydraulic fluid cooler.

18. The aquatic harvester of claim 17 wherein said hydraulic fluid cooler is generally rectangular in configuration with the length of said cooler disposed transversly across said deck in substantially parallel relationship with respect to said paddle wheels.

19. The aquatic harvester of claim 18 wherein:

said carriage means further comprises a frame; wheels attached to the bottom of said frame; rail means extending longitudinally along the deck in spaced relationship and receiving said wheels; and drive means carried by said frame whereby said wheels are selectively caused to traverse said rail means in a forward and reverse direction along the deck; and said rake means further comprises a pair of pivot arms pivotally attached to said frame in spaced relationship; a tooth bar joining the free ends of said pivot arms, a plurality of teeth extending downwardly in spaced relationship from said tooth bar; and rake lift means secured to said frame and cooperating with at least one of said pivot arms, whereby said pivot arms are caused to pivot with respect to said frame to raise and lower said teeth.

20. The aquatic harvester of claim 19 wherein:

(a) said drive means further comprises a drive sprocket rotatably carried by said frame; a drive motor in cooperation with said drive sprocket; a pair of idler sprockets rotatably carried by said frame and located on each side of said drive sprocket; a chain having both ends secured to opposite, spaced points on said deck, said chain engaging said drive sprocket and said idler sprockets in serpentine configuration intermediate said spaced points, whereby rotation of said drive sprocket causes said carriage to move with respect to said chain; and (b) said wheels are further characterized by a first pair of wheels having first wheel flanges, said first pair of wheels located on one side of said frame and said first wheel flanges engaging one of said rail means and a second pair of wheels having second wheel flanges, said second pair of wheels located on the opposite end of said frame from said first pair of wheels, said second wheel flanges engaging another of said rail means.

* * * * *